(12) United States Patent
Dotan et al.

(10) Patent No.: US 9,455,972 B1
(45) Date of Patent: Sep. 27, 2016

(54) PROVISIONING A MOBILE DEVICE WITH A SECURITY APPLICATION ON THE FLY

(71) Applicant: EMC Corporation, Hopkinton, MA (US)

(72) Inventors: Yedidya Dotan, Newton, MA (US); Lawrence N. Friedman, Arlington, MA (US); Gareth Richards, Woodstock (GB)

(73) Assignee: EMC Corporation, Hopkinton, MA (US)

( * ) Notice: Subject to any disclaimer, the term of this patent is extended or adjusted under 35 U.S.C. 154(b) by 167 days.

(21) Appl. No.: 14/041,108

(22) Filed: Sep. 30, 2013

(51) Int. Cl.
*H04L 29/06* (2006.01)
*G06F 9/00* (2006.01)
*G06F 17/00* (2006.01)
*H04L 9/32* (2006.01)

(52) U.S. Cl.
CPC .......... *H04L 63/08* (2013.01); *H04L 9/32* (2013.01); *H04L 9/321* (2013.01); *H04L 9/3213* (2013.01)

(58) Field of Classification Search
CPC ... H04L 63/0272; H04L 63/08; H04L 67/34; H04L 41/0806; H04L 41/0886; H04L 9/32; H04L 9/321; H04L 9/3213; H04L 9/3228; H04W 4/003; G06F 8/61
USPC .......... 713/191; 709/217, 218, 220–222, 225
See application file for complete search history.

(56) References Cited

U.S. PATENT DOCUMENTS

| | | | |
|---|---|---|---|
| 7,203,940 B2* | 4/2007 | Barmettler et al. | 717/178 |
| 7,246,351 B2* | 7/2007 | Bloch et al. | 717/175 |
| 7,448,080 B2* | 11/2008 | Karjala et al. | 726/15 |
| 7,469,140 B1* | 12/2008 | Papineau | 455/418 |
| 7,779,408 B1* | 8/2010 | Papineau | 717/178 |
| 7,886,345 B2 | 2/2011 | Kaliski et al. | |
| 8,370,899 B2* | 2/2013 | Shoval et al. | 726/2 |
| 8,600,941 B1 | 12/2013 | Raj et al. | |
| 8,701,199 B1* | 4/2014 | Dotan et al. | 726/25 |
| 8,707,050 B1 | 4/2014 | Robinson et al. | |
| 8,737,981 B2* | 5/2014 | Jacobs et al. | 455/419 |
| 8,751,801 B2 | 6/2014 | Harris et al. | |
| 8,752,156 B1 | 6/2014 | van Dijk et al. | |
| 8,819,803 B1* | 8/2014 | Richards et al. | 726/9 |
| 2002/0129129 A1* | 9/2002 | Bloch et al. | 709/220 |
| 2003/0204843 A1* | 10/2003 | Barmettler et al. | 717/178 |
| 2004/0203690 A1* | 10/2004 | Sprigg et al. | 455/419 |
| 2004/0205164 A1* | 10/2004 | Jacobs et al. | 709/219 |
| 2004/0268148 A1* | 12/2004 | Karjala et al. | 713/201 |
| 2007/0056020 A1* | 3/2007 | Ward | 726/3 |
| 2008/0046371 A1* | 2/2008 | He et al. | 705/51 |
| 2008/0274765 A1* | 11/2008 | Lopez et al. | 455/552.1 |
| 2010/0011116 A1* | 1/2010 | Thornton et al. | 709/230 |

(Continued)

*Primary Examiner* — Tae Kim
(74) *Attorney, Agent, or Firm* — BainwoodHuang

(57) ABSTRACT

A technique provisions a mobile device (e.g., a smart phone, a tablet, a personal digital assistant, etc.) with a security application on the fly. The technique involves providing, by processing circuitry of the mobile device, an initial access request to an enterprise gateway which is operated by an enterprise. The technique further involves receiving, by the processing circuitry, an enterprise response message from the enterprise gateway in response to the initial access request. The enterprise response message denies access to a set of enterprise resources of the enterprise. The technique further involves automatically prompting, by the processing circuitry, the mobile device to install a mobile security application from an application server in response to the enterprise response message denying access to the set of enterprise resources of the enterprise.

16 Claims, 4 Drawing Sheets

(56) References Cited

U.S. PATENT DOCUMENTS

2010/0190532 A1* 7/2010 Sampat et al. ............ 455/569.1
2012/0005477 A1* 1/2012 Wei et al. .................... 713/153
2012/0005745 A1* 1/2012 Wei et al. ...................... 726/15
2012/0042365 A1* 2/2012 Shoval et al. ................... 726/7

* cited by examiner

PROVISIONING A MOBILE DEVICE WITH A SECURITY APPLICATION ON THE FLY

BACKGROUND

A conventional routine for provisioning a smart phone with a security application to control access enterprise resources involves the smart phone user manually opening a ticket with a human information technology (IT) expert. The human IT expert then works with the smart phone user to properly install the security application and configure the security application to properly obtain access tokens enabling the smart phone user to then access the enterprise resources.

Such installation activity may involve the human IT expert providing the smart phone user with a correct activation code for the security application. Additionally, such activity may involve the human IT expert remaining available to the smart phone user to ensure the smart phone user properly installs the security application, properly enters the activation code, properly configures the security application to obtain the access tokens, and so on.

SUMMARY

Unfortunately, there are deficiencies to the above-described conventional approach to provisioning a smart phone with a security application to control access to enterprise resources. For example, the manual nature of this approach makes it burdensome on both the smart phone user and the human IT expert. However, without such close attention, it is possible that the security application will be improperly installed or installed while the smart phone is in an unreliable or risky state. Additionally, if the smart phone users are left on their own to obtain and install security applications, the smart phone users are more vulnerable downloading and installing malicious applications (e.g., rogue applications that appear to be legitimate security applications that the smart phone users are looking for).

In contrast to the above-described conventional approach to provisioning a smart phone with a security application to control access to enterprise resources which requires extensive human participation, improved techniques are directed to automatically provisioning a mobile device with a security application on the fly. In particular, after an initial access request from the mobile device to an enterprise gateway is denied, the mobile device is automatically prompted to install a mobile security application from an application server. Such prompting may involve receipt of a URL from the enterprise gateway to accurately direct the mobile device to download and install the correct mobile security application from the application server. Additionally, such activity can be highly automated to minimize human effort (e.g., a signed enterprise identifier can be obtained from the enterprise gateway and trusted by a security server which activates the mobile security application on the mobile device).

One embodiment is directed to a method of provisioning a mobile device with a security application on the fly. The method includes providing, by processing circuitry of the mobile device, an initial access request to an enterprise gateway which is operated by an enterprise. The method further includes receiving, by the processing circuitry, an enterprise response message from the enterprise gateway in response to the initial access request. The enterprise response message denies access to a set of enterprise resources of the enterprise. The method further includes automatically prompting, by the processing circuitry, the mobile device to install a mobile security application from an application server in response to the enterprise response message denying access to the set of enterprise resources of the enterprise.

In some arrangements, the enterprise response message includes an address identifying the application server. In these arrangements, prompting the mobile device to install the mobile security application from the application server includes prompting a user of the mobile device for an accept command to (i) download the mobile security application from the application server and (ii) automatically install the mobile security application on the mobile device.

In some arrangements, the initial access request is sent to the enterprise gateway via a browser running on the mobile device. In these arrangements, the address identifying the application server is a universal resource locator (URL) which identifies a security application distribution website as the application server. Here, the method further includes receiving the accept command from the user of the mobile device and, in response to the accept command, providing an application request to the security application distribution website based on the URL. The method further includes receiving a website response to the application request from the security application distribution website, the website response including downloading and installation of the mobile security application on the mobile device.

In some arrangements, the enterprise response message further includes a signed enterprise identifier which identifies the enterprise. In these arrangements, providing the application request to the security application distribution website includes sending the signed enterprise identifier to the security application distribution website. The mobile security application is provided to the mobile device from the security application distribution website as part of the website response only if the security application distribution website successfully verifies the signed enterprise identifier.

In some arrangements, the enterprise response message further includes an enterprise identifier which identifies the enterprise. In these arrangements, providing the application request to the security application distribution website includes sending the enterprise identifier to the security application distribution website. The mobile security application is selected, by the security application distribution website, from a set of different security applications based on the enterprise identifier.

In some arrangements, providing the application request to the security application distribution website includes sending a location identifier to the security application distribution website. The location identifier identifies a current location of the mobile device. The mobile security application is provided to the mobile device from the security application distribution website as part of the website response only if the security application distribution website determines that the current location is an authorized installation location.

In some arrangements, the method further includes, after the mobile security application is downloaded and installed on the mobile device, invoking the mobile security application to establish an activation session between the mobile device and a security server.

In some arrangements, the enterprise response message further includes a one-time request token. In these arrangements, invoking the mobile security application includes establishing the activation session with the security server using the one-time request token. At least one of the mobile security application and the security server is prevented from establishing another activation session using a copy of the one-time request token.

In some arrangements, the method further includes, while the activation session between the mobile device and the security server is established, sending a set of authentication factors to the security server to enable the security server to create a user profile based on the set of authentication factors and bind the user profile to the enterprise.

In some arrangements, the method further includes, after the user profile is bound to the enterprise, providing an authentication request to the security server using the mobile security application, the authentication request including a new set of authentication factors. The method further includes receiving an authentication response from the security server in response to the authentication request.

In some arrangements, receiving the authentication response from the security server includes receiving an access token from the security server when the security server successfully authenticates the user based on the new set of authentication and the user profile. Alternatively, receiving the authentication response from the security server includes receiving an indication that authentication is considered unsuccessful when the security server does not successfully authenticate the user based on the new set of authentication and the user profile.

In some arrangements, the authentication response includes an access token from the security server. In these arrangements, the method further includes providing another access request to the enterprise gateway which is operated by the enterprise, the other access request including the access token from the security server; and receiving another enterprise response message from the enterprise gateway in response to the other access request, the other enterprise response message granting access to the set of enterprise resources of the enterprise.

It should be understood that, in the cloud context, certain electronic circuitry (e.g., circuitry of the enterprise gateway, the application server, the security server, etc.) can be formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in provisioning a mobile device with a security application on the fly.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to automatically provisioning a mobile device with a mobile security application on the fly. Along these lines, after an initial access request from the mobile device to an enterprise gateway is denied, the mobile device is automatically prompted to install a mobile security application from an application server. Such prompting may involve receipt of a URL from the enterprise gateway to accurately direct the mobile device to download and install the correct mobile security application. Furthermore, such activity can be highly automated to minimize human involvement (e.g., a signed enterprise identifier can be obtained from the enterprise gateway and trusted by a security server which activates the mobile security application on the mobile device).

Figure 1:
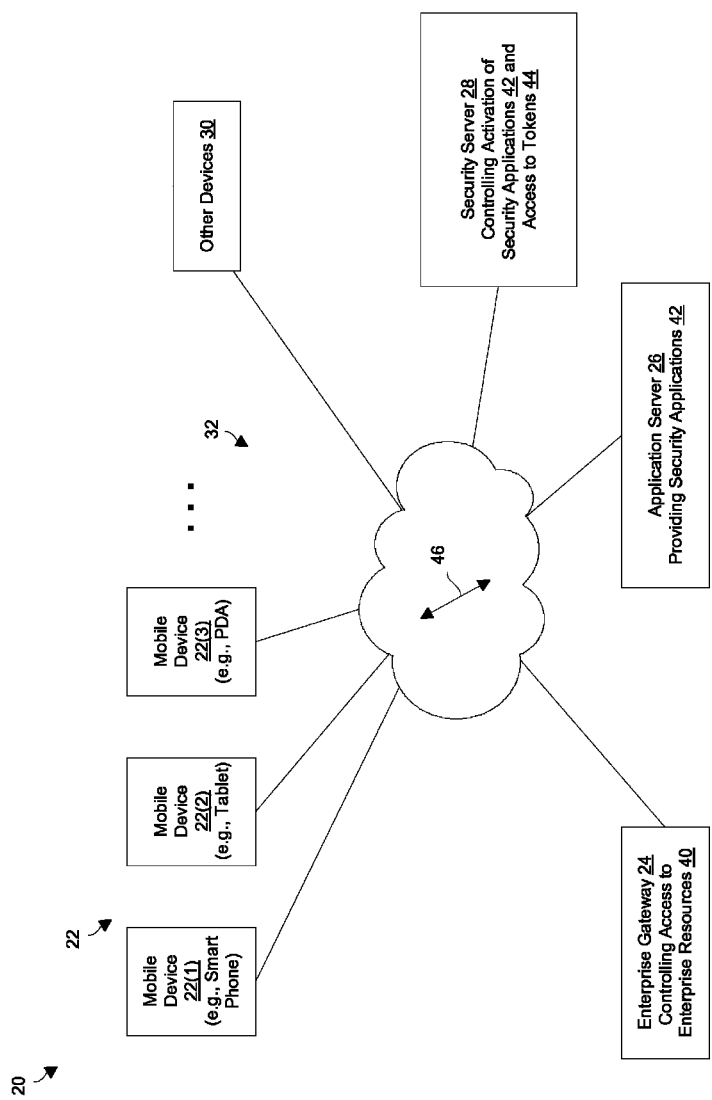
FIG. 1 is a block diagram of an electronic environment which supports automatic provisioning of a mobile device with a mobile security application on the fly.

FIG. 1 shows an electronic environment 20 which supports automatic provisioning of a mobile device with a mobile security application on the fly. The electronic environment 20 includes mobile devices 22(1), 22(2), 22(3), . . . (collectively, mobile devices 22), an enterprise gateway 24, an application server 26, a security server 28, other devices 30, and a communications medium 32.

Each mobile device 22 is constructed and arranged to enable a respective user to perform useful work (e.g., access files, use email, perform online transactions, play games, communicate with other users, etc.). Some examples of mobile devices 22 include smart phones, tablets, personal digital assistants (PDAs), and the like.

The enterprise gateway 24 is constructed and arranged to control access to one or more enterprise resources 40. Such resources 40 may include file system access, software application access, VPN access, website access, access to other types of content (e.g., games, videos, music, etc.), the ability to perform transactions, and so on.

The application server 26 is constructed and arranged to provide applications to various types of computerized devices including the mobile devices 22. In particular, the application server 26 is a source of a security application 42 which is suitable for use by the mobile devices 22. Along these lines, the application server 26 may be an online app store that distributes applications to the public (e.g., free apps, apps for purchase, etc.). Alternatively, the application server 26 may be an application repository for a particular enterprise or entity (e.g., a corporate app server), etc.

The security server 28 is constructed and arranged to control activation of the security application 42. Additionally, the security server 28 is constructed and arranged to authenticate users and distribute access tokens 44 enabling authenticated users of the mobile devices 22 to access the enterprise resources 40.

The other devices 30 represent additional electronic apparatus which may reside in the electronic environment 20. Such apparatus may include non-mobile devices 22 (e.g., general purpose computers, user workstations, etc.) which are serviced by the enterprise server 24, the application server 26, the security server 28, etc. Such apparatus may further include unrelated devices (e.g., other servers, appliances, potentially malicious devices, etc.).

The communications medium 32 is constructed and arranged to connect the various components of the electronic environment 20 together to enable these components to exchange electronic signals 46. At least a portion of the communications medium 32 is illustrated as a cloud to indicate that the communications medium 32 is capable of having a variety of different topologies including backbone, hub-and-spoke, loop, irregular, combinations thereof, and so on. Along these lines, the communications medium 32 may include copper-based data communications devices and cabling, fiber optic devices and cabling, wireless devices, combinations thereof, etc. Furthermore, the communications medium 32 is capable of supporting LAN-based communications, SAN-based communications, cellular communications, combinations thereof, and so on. In some arrangements, at least a portion of the communications medium 32 is publicly accessible.

During operation, the various components of the electronic environment 20 communicate with each other to perform useful work. In particular, in order for a user of a mobile device 22 to access an enterprise resource 40 via the enterprise gateway 24, the user's mobile device 22 must be able to run a security application 42 on the mobile device 22 to retrieve an access token 44 from the security server 28 and then provide that token 44 to the enterprise gateway 24. As will be explained in further detail shortly, proper installation and activation of the security application on the mobile device 22 starts with a communications exchange with the enterprise gateway 24. Such an exchange initiates installation and provisioning of the mobile device 22 with the correct security application 42, as well as automates the process making it less burdensome on the user and less prone to error (e.g., less lengthy typing by humans). Further details will now be provided with reference to FIG. 2.

Figure 2:
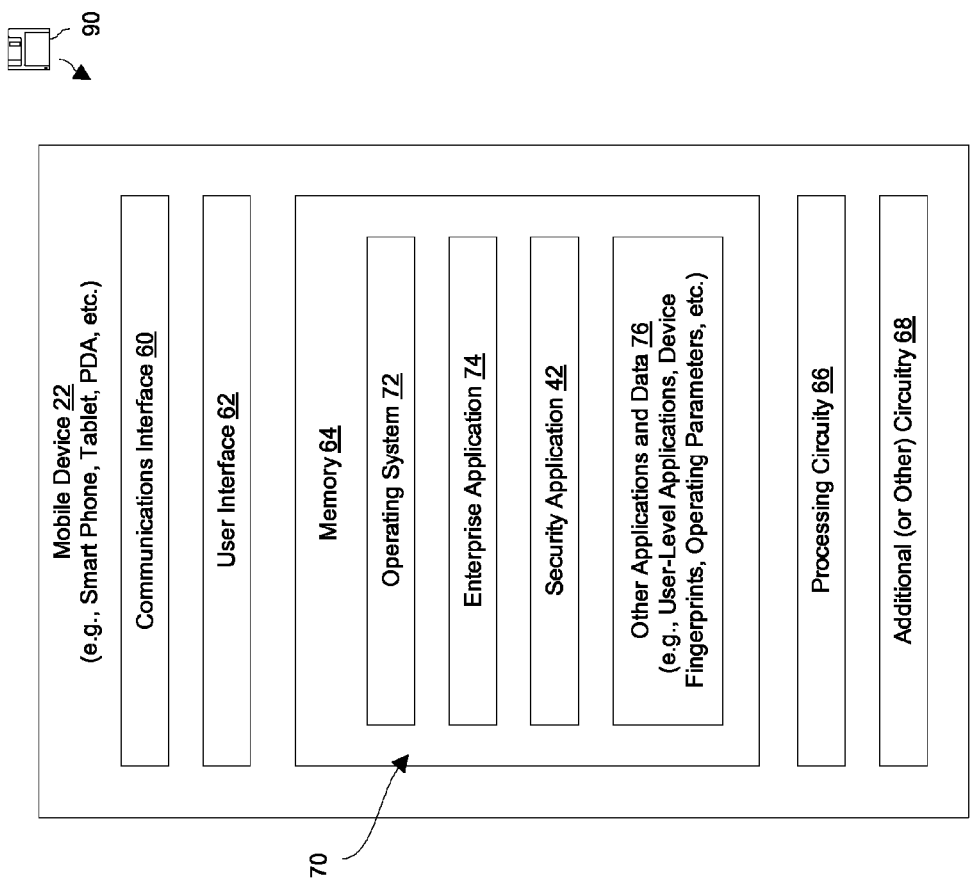
FIG. 2 is a block diagram of a mobile device of FIG. 1.

FIG. 2 shows a mobile device 22 which is suitable for provisioning with a mobile security application 42 on the fly. The mobile device 22 includes a communications interface 60, a user interface 62, memory 64, processing circuitry 66, and additional (or other) circuitry 68. The architecture and/or form factor of the mobile device may be that of a handheld apparatus such as a smart phone, a tablet device, a PDA, combinations thereof, etc.

The communications interface 60 is constructed and arranged to connect the mobile device 22 to the communications medium 32 (FIG. 1). Accordingly, the communications interface 62 enables the mobile device 22 to communicate with the other components of the electronic environment 20. Such communications may be wireless, copper-based, optical, combinations thereof, etc. (e.g., cellular, Bluetooth, IP-based, and so on).

The user interface 62 is constructed and arranged to receive input from a user and provide output to the user. In the context of a smart phone, a tablet or PDA, the user interface 62 may be formed by a touch screen or similar device.

The memory 64 is intended to represent both volatile storage (e.g., DRAM, SRAM, etc.) and non-volatile storage (e.g., flash memory, magnetic disk drives, etc.). The memory 64 stores a variety of software constructs 70 including an operating system 72 which controls and manages resources of the mobile device 22 (e.g., memory, processing cycles, etc.), an enterprise application 74 which communicates with the enterprise gateway 24 (e.g., a browser, a specialized GUI, etc.), a security application 42 which enables the user of the mobile device 22 to authenticate with the security server 28 and obtain tokens 44 to access enterprise resources 40 controlled by the enterprise gateway 24, and other applications and data 76 (e.g., user-level applications, device fingerprints, operating parameters and settings, etc.).

The processing circuitry 66 is constructed and arranged to operate in accordance with the various software constructs 70 stored in the memory 64. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the mobile device 22. The computer program product 90 has a non-transitory (or non-volatile) computer readable medium which stores a set of instructions which controls one or more operations of the mobile device 22. Examples of suitable computer readable storage media include tangible articles of manufacture and apparatus which store instructions in a non-volatile manner such as CD-ROM, flash memory, disk memory, tape memory, and the like.

The additional (or other) circuitry 68 represents other portions of the mobile device 22 and may depend on the type of mobile device 22. For example, the additional circuitry 68 may include GPS circuitry to identify geo-location, a camera for video input, a microphone for audio input, a speaker for audio output, a fingerprint reader to read user fingerprints, etc. Further details will now be provided with reference to FIG. 3.

Figure 3:
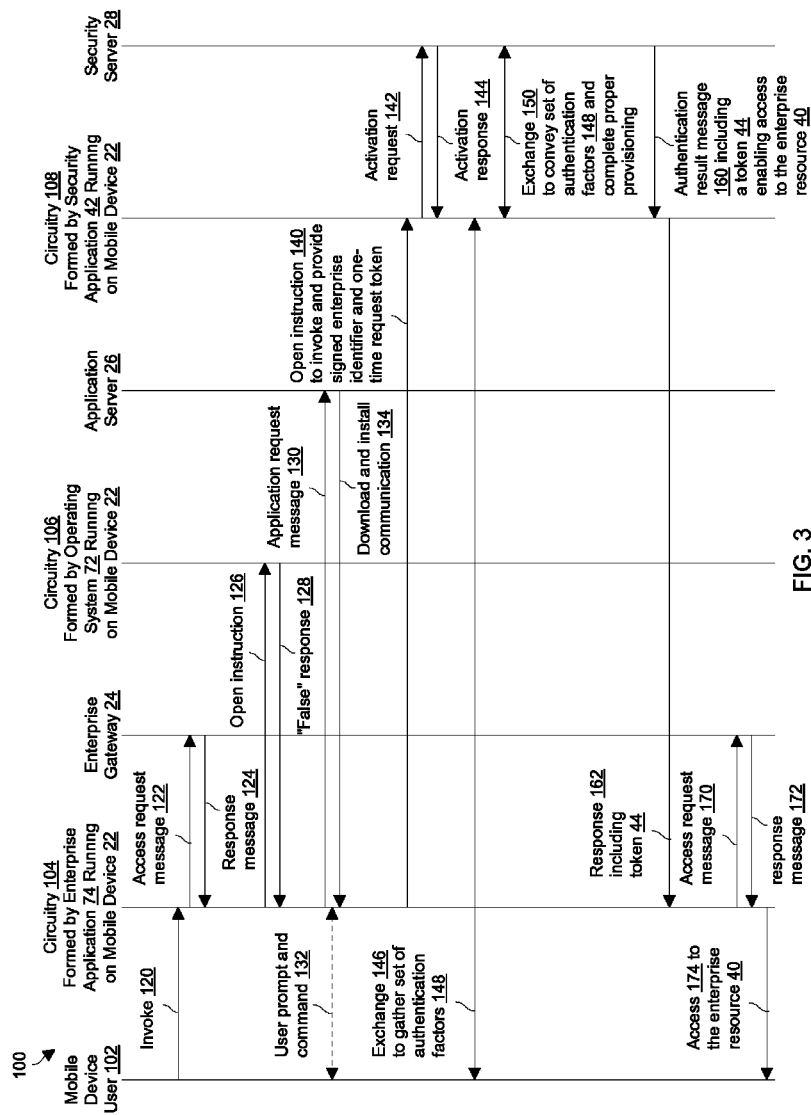
FIG. 3 is a sequence diagram detailing particular communications exchanged between devices of the electronic environment during automatic provisioning of a mobile device with a security application on the fly.

FIG. 3 is a sequence diagram 100 detailing particular communications exchanged between the various apparatus of the electronic environment 20 (also see electronic signals 46 in FIG. 1). Suppose that the user 102 of the mobile device 22 already has the operating system 72 and the enterprise application 74 installed, and is capable of running these software applications. Further suppose that the mobile device 22 does not initially have the security application 42 installed.

It should be understood that the processing circuitry 66 of the mobile device 22, when running the enterprise application 74, forms specialized circuitry 104. Similarly, the processing circuitry 66, when running the operating system 72, forms specialized circuitry 106. Eventually, after the mobile device 22 obtains and installs the security application 42, the processing circuitry 66 forms specialized circuitry 108 when running the security application 42.

The following activities occur to (i) properly provision the mobile device 22 with the mobile security application 42 on the fly, and then (ii) enable the user 102 to access an enterprise resource 40 via the enterprise gateway 24. First, the user 102 invokes the enterprise application 74 (arrow 120). In some arrangements, the enterprise application 74 is a browser application that, once invoked on the mobile device 22, forms a mobile browser (i.e., circuitry 104). In other arrangements, the enterprise application 74 is not a browser application (e.g., a special enterprise GUI, a user-level application with web capabilities, etc.).

Once the enterprise application 74 is invoked to form the circuitry 104, the circuitry 104 contacts the enterprise gateway 24. In particular, the circuitry 104 sends an initial access request message 122 to the enterprise gateway 24. The initial access request message 122 may identify a particular set of resources 40 that the user 102 wishes to access, but does not include an access token 44 which is required by the enterprise gateway 24 before allowing access to the particular set of resources 40.

In response to the initial access request message 122, the enterprise gateway 24 returns a response message 124 denying access to the particular resource 40. The response message 124 includes (i) an instruction to automatically launch the mobile security application 42 if the mobile security application 42 is already installed on the mobile device 22, (ii) a signed enterprise identifier, (iii) a one-time request token, and (iv) an address (or link) to the security application 42 on the application server 26, among other things. In some mobile browser arrangements, the address is a universal resource locator (URL) to the security application 42 on the application server 26.

Upon receipt of the response message 124, the circuitry 104 provides an instruction 126 to the circuitry 106 (i.e., the processing circuitry 66 running the operating system 72) to launch the mobile security application 42. In some arrangements, the circuitry 104 uses a standard call such as Google API or a canopenURL call. Since the mobile security application 42 is not yet installed on the mobile device 22, the circuitry 104 returns a message 128 (e.g., "false") indicating that it could not launch the mobile security application 42.

Next, the circuitry 104 sends an application request message 130 to the application server 26. Depending on the particular operating platform of the mobile device 22, the circuitry 104 may go directly to a website of the application server 26 (i.e. navigate to the store front or security application page) or perhaps even automatically pull and install the security application 42. Optionally and as a precaution, the circuitry 104 may prompt the user 102 for a user command before downloading from the application server 26 and installing the security application 26 on the mobile device 22 (see dashed double arrow 132). Arrow 134 represents the mobile device 22 downloading and installing the mobile security application 42 from the application server 26. It should be understood that the arrows 130-134 are shown as only involving the mobile browser (i.e., circuitry 104) for simplicity, but that installation of the security application 42 of course involves the operating system (i.e., circuitry 106).

With the mobile security application 42 now downloaded and installed on the mobile device 22, the circuitry 104 invokes the security application 42. It should be understood that such activity may be in the form of an operating system instruction similar to that of the earlier mentioned open instruction 126. This invocation is illustrated in FIG. 3 by arrow 140 and includes delivery of the signed enterprise identifier and the one-time request token obtained from the enterprise gateway (see the response message 124).

The circuitry 108, which is formed by the processing circuitry 66 running the security application 42, then sends an activation request message 142 to the security server 28. The one-time request token may be used by the circuitry 108 to prevent repeated tampering of the security application 42 (i.e., the user must reconnect with the enterprise gateway 24 and obtain another one-time request token to retry if something has gone wrong).

The activation request message 142 includes the signed enterprise identifier to enable the security server 28 to verify that the mobile device 22 can be trusted. Optionally, the activation request message 142 may include the one-time request token to enable the security server 28 to prevent retries as well.

The security server 28 replies to the activation request message 142 with an activation response message 144. The activation response message 144 configures the circuitry 108 (i.e., processing circuitry 66 running the security application 42) to properly operate on the mobile device 22. To fully activate the mobile security application 42, the circuitry 108 perform an exchange 146 with the user 102 to gather a set of authentication factors 148 for use in future user authentication. Such authentication factors 148 may include device fingerprints, user information, biometrics, and so on. The circuitry 108 conveys the set of set of authentication factors 148 to the security server 28 and performs a further exchange 150 to receive proper provisioning from the security server 28. Such provisioning includes creating a user profile and binding the user profile to the enterprise (based on the enterprise identifier included in the activation request 142) by the security server 28. Additionally, such provisioning may include other activation activities such as unlocking certain resources on the mobile device 22, provisioning the mobile device 22 with certain secrets, and so on.

It should be understood that, as part of this process, the security server 28 performs an initial assessment of the authentication factors 148 (e.g., location, device fingerprints, user information, etc.) to determine whether to allow provisioning at this time. In some situations, the security server 28 may decide not to complete the activation process.

For example, in some arrangements, the security server 28 identifies the current location of the mobile device 22 during the process 100. Such a determination can be made via GPS circuitry within the mobile device 22, mapping of source address information from messages of the mobile device 22 to geolocation, other location identifying factors, and so on. The security server 28 does not complete activation if the mobile device 22 currently resides in an unauthorized location. Such operation enables the security server 28 to restrict activation to certain safe locations such as within the enterprise's facility, within the premises of the security server, within certain campuses of the enterprise, within certain cities/states/countries, combinations thereof, and other "on premises" locales. Additionally, the security server 28 can deny activation if the mobile device 22 currently resides in certain bad locations, and so on.

Once the circuitry 108 is properly provisioned, the security server 28 provides an authentication result message 160 to the circuitry 108. The authentication result message 160 provides the user 102 with confirmation that provisioning has successfully completed. Additionally, the authentication result message 160 includes an access token 44 which the circuitry 108 delivers to the circuitry 104 (i.e., formed by the processing circuitry 66 running the enterprise application 74) in the form of a response signal 162.

At this point, the circuitry 104 has the access token 44. The circuitry 104 sends, to the enterprise gateway 24, an access request message 170 which includes the access token 44 and which requests access to the set of enterprise resources 40. Since the access request message 170 includes the access token 44, the enterprise gateway 24 provides a response message 172 with granted access to the set of enterprise resources 40. Accordingly, the user 102 now has access 174 to the set of enterprise resources 40.

In the future, the user 102 is able invoke the enterprise application 74 (arrow 120) and obtain access to the enterprise resource 40 using the access token 44 (arrows 170-174). If the access token 44 has expired or is a one-time use access token, the user 102 may obtain another access token 44 from security server 28 by running the mobile security application 42 and authenticating with the security server 28 in a normal manner since the security application 42 is now properly installed and provisioned on the mobile device 22.

One should appreciate that the above-described sequence of activities 100 reduces the cost and complexity of integration. In particular, there is less human involvement yet the process has built-in safeguards such as the ability to verify trust via the signed enterprise identifier, the ability to prevent re-performance using the one-time request token, the ability to control which security application 42 is installed via an address (e.g., a URL or link) supplied by the enterprise gateway 24, and so on. Furthermore, the sequence of activities 100 reduces other risks such as the risk of repeated authentication attempts (i.e., an attacker repeating the process until the attacker finds a user to hack) by tracking device and location fingerprints, restricting activation or further provisioning while the mobile device 22 resides in location X, permitting activation and further provisioning while the mobile device 22 resides in location Y, and so on. Further details will now be provided with reference to FIG. 4.

Figure 4:
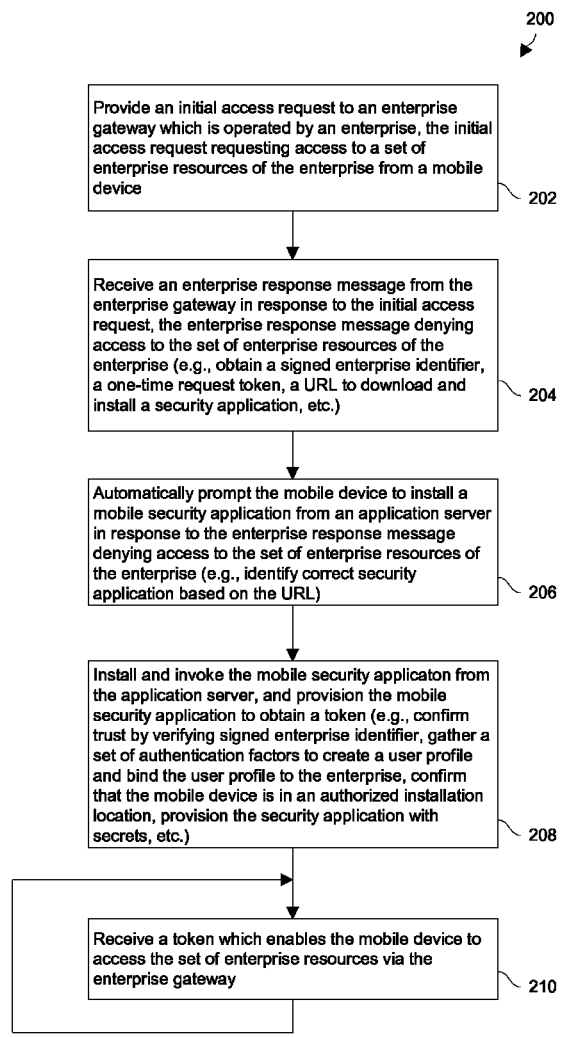
FIG. 4 is a flowchart of a procedure which is performed by the mobile device of FIG. 2.

FIG. 4 is a flowchart of a procedure 200 which is performed by a mobile device when being provisioned with a security application on the fly. At 202, the mobile device provides an initial access request to an enterprise gateway which is operated by an enterprise. The initial access request asks for access to a set of enterprise resources of the enterprise from the mobile device. As mentioned earlier, such enterprise resources make take a variety of forms, e.g., content, permissions, login access, applications, games, the ability to perform transactions, and so on.

At 204, the mobile device receives an enterprise response message from the enterprise gateway in response to the initial access request. The enterprise response message denies access to a set of enterprise resources of the enterprise. As mentioned earlier, the enterprise response message includes (i) an instruction to automatically launch the security application if the security application is already installed, (ii) a signed enterprise identifier, (iii) a one-time request token, and (iv) an address to the security application on the application server 26, among other things.

At 206, the mobile device is automatically prompted to install a mobile security application from an application server in response to the enterprise response message denying access to the set of enterprise resources of the enterprise. Here, the mobile device is able to obtain the correct security application based on the address included in the enterprise response message.

At 208, the mobile device installs and invokes the mobile security application from the application server, and provisions the mobile security application to obtain a token from a security server. As mentioned earlier in connection with FIG. 3, the security server is able to confirm trust by verifying signed enterprise identifier. Additionally, the security server is able to perform an initial risk assessment based on current location of the mobile device, device fingerprints (e.g., prevent repeat attacks), user information, and so on. Accordingly, the security server creates a new user profile which it binds to the particular enterprise based on the enterprise identifier, and is thus able to perform routine authentication on the mobile device user to control enterprise access in the future. As a result, the mobile security application is registered and provisioned on the fly.

At 210, the mobile device receives an access token from the security server. The token enables the mobile device to access the set of enterprise resources via the enterprise gateway.

It should be understood that, after the mobile security application is properly installed and provisioned on the mobile device, the mobile device is able to routinely obtain additional access tokens via authentication using the mobile security application to access the set of enterprise resources via the enterprise gateway in the future (see return arrow in FIG. 4).

As described above, improved techniques are directed to automatically provisioning a mobile device with a security application on the fly. In particular, after an initial access request from the mobile device to an enterprise gateway is denied, the mobile device is automatically prompted to install a mobile security application from an application server. Such prompting may involve receipt of a URL from the enterprise gateway to accurately direct the mobile device to download and install the correct mobile security application. Additionally, such activity can be highly automated to minimize human effort and complexity (e.g., a signed identifier can be obtained from the gateway and trusted by a security server which activates the mobile security application).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources (e.g., one or more of the servers) may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the above-described techniques were described in the context of provisioning a mobile device. However, these same techniques are applicable to non-mobile devices as well, e.g., general purpose computers, user workstations, smart televisions, and other smart apparatus as well. Such modifications and enhancements are intended to belong to various embodiments of the disclosure.

What is claimed is:

1. A method of provisioning a mobile device with a security application on the fly, the method comprising:
  providing, by processing circuitry of the mobile device, an initial access request to an enterprise gateway which is operated by an enterprise, the initial access request requesting access to a set of enterprise resources of the enterprise;
  receiving, by the processing circuitry, an enterprise response message from the enterprise gateway in response to the initial access request, the enterprise response message denying access to the set of enterprise resources of the enterprise; and
  automatically prompting, by the processing circuitry, the mobile device to install a mobile security application from an application server in response to the enterprise response message denying access to the set of enterprise resources of the enterprise;
wherein the enterprise response message includes an address identifying the application server;
wherein prompting the mobile device to install the mobile security application from the application server includes:

prompting a user of the mobile device for an accept command to (i) download the mobile security application from the application server and (ii) automatically install the mobile security application on the mobile device;

wherein the initial access request is sent to the enterprise gateway via a browser running on the mobile device;

wherein the address identifying the application server is a universal resource locator (URL) which identifies a security application distribution website as the application server;

wherein the method further comprises:

receiving the accept command from the user of the mobile device, in response to the accept command, providing an application request to the security application distribution website based on the URL, receiving a website response to the application request from the security application distribution website, the website response including downloading and installation of the mobile security application on the mobile device, after the mobile security application is downloaded and installed on the mobile device, invoking the mobile security application to establish an activation session between the mobile device and a security server, while the activation session between the mobile device and the security server is established, sending a set of authentication factors to the security server to enable the security server to create a user profile based on the set of authentication factors and bind the user profile to the enterprise, after the user profile is bound to the enterprise, providing an authentication request to the security server using the mobile security application, the authentication request including a new set of authentication factors, and receiving an authentication response from the security server in response to the authentication request;

wherein the authentication response includes an access token from the security server; and wherein the method further comprises:

providing another access request to the enterprise gateway which is operated by the enterprise, the other access request including the access token from the security server, and receiving another enterprise response message from the enterprise gateway in response to the other access request, the other enterprise response message granting access to the set of enterprise resources of the enterprise.

2. A method as in claim 1 wherein the enterprise response message further includes a signed enterprise identifier which identifies the enterprise; and wherein providing the application request to the security application distribution website includes:

sending the signed enterprise identifier to the security application distribution website, the mobile security application being provided to the mobile device from the security application distribution website as part of the website response only if the security application distribution website successfully verifies the signed enterprise identifier.

3. A method as in claim 1 wherein the enterprise response message further includes an enterprise identifier which identifies the enterprise; and wherein providing the application request to the security application distribution website includes:

sending the enterprise identifier to the security application distribution website, the mobile security application being selected, by the security application distribution website, from a set of different security applications based on the enterprise identifier.

4. A method as in claim 1 wherein providing the application request to the security application distribution website includes:

sending a location identifier to the security application distribution website, the location identifier identifying a current location of the mobile device, the mobile security application being provided to the mobile device from the security application distribution website as part of the website response only if the security application distribution website determines that the current location is an authorized installation location.

5. A method as in claim 1 wherein the enterprise response message further includes a one-time request token; and wherein invoking the mobile security application includes:

establishing the activation session with the security server using the one-time request token, at least one of the mobile security application and the security server being prevented from establishing another activation session using a copy of the one-time request token.

6. A method as in claim 1 wherein the security server is constructed and arranged to:

provide receiving, as part of the authentication responses, access tokens when the security server successfully authenticates users; and provide, as part of the authentication responses, indications that authentication is considered unsuccessful when the security server does not successfully authenticate the users.

7. A method as in claim 1 wherein the application server is an online app store.

8. A method as in claim 7 wherein the enterprise response message further includes a one-time use token.

9. A mobile device, comprising:

a wireless interface;

memory; and control circuitry coupled to the wireless interface and the memory, the memory storing instructions which, when carried out by the control circuitry, cause the control circuitry to:

provide, through the wireless interface, an initial access request to an enterprise gateway which is operated by an enterprise, receive, through the wireless interface, an enterprise response message from the enterprise gateway in response to the initial access request, the enterprise response message denying access to a set of enterprise resources of the enterprise, and automatically prompt the mobile device to install a mobile security application from an application server in response to the enterprise response message denying access to the set of enterprise resources of the enterprise;

wherein the enterprise response message includes an address identifying the application server;

wherein the control circuitry, when prompting the mobile device to install the mobile security application from the application server, is constructed and arranged to:

prompt a user of the mobile device for an accept command to (i) download the mobile security application from the application server and (ii) automatically install the mobile security application on the mobile device;

wherein the initial access request is sent to the enterprise gateway via a browser running on the mobile device;
wherein the address identifying the application server is a universal resource locator (URL) which identifies a security application distribution website as the application server;
wherein the control circuitry is further constructed and arranged to:
  receive the accept command from the user of the mobile device,
  in response to the accept command, provide an application request to the security application distribution website based on the URL,
  receive a website response to the application request from the security application distribution website, the website response including downloading and installation of the mobile security application on the mobile device,
  after the mobile security application is downloaded and installed on the mobile device, invoke the mobile security application to establish an activation session between the mobile device and a security server,
  while the activation session between the mobile device and the security server is established, send a set of authentication factors to the security server to enable the security server to create a user profile based on the set of authentication factors and bind the user profile to the enterprise,
  after the user profile is bound to the enterprise, provide an authentication request to the security server using the mobile security application, the authentication request including a new set of authentication factors, and
  receive an authentication response from the security server in response to the authentication request;
wherein the authentication response includes an access token from the security server; and
wherein the control circuitry is further constructed and arranged to:
  provide another access request to the enterprise gateway which is operated by the enterprise, the other access request including the access token from the security server, and
  receive another enterprise response message from the enterprise gateway in response to the other access request, the other enterprise response message granting access to the set of enterprise resources of the enterprise.

10. A mobile device as in claim 9 wherein the enterprise response message further includes a signed enterprise identifier which identifies the enterprise; and wherein the control circuitry, when providing the application request to the security application distribution website, is constructed and arranged to:
  send the signed enterprise identifier to the security application distribution website, the mobile security application being provided to the mobile device from the security application distribution website as part of the website response only if the security application distribution website successfully verifies the signed enterprise identifier.

11. A mobile device as in claim 9 wherein the enterprise response message further includes an enterprise identifier which identifies the enterprise; and wherein the control circuitry, when providing the application request to the security application distribution website, is constructed and arranged to:
  send the enterprise identifier to the security application distribution website, the mobile security application being selected, by the security application distribution website, from a set of different security applications based on the enterprise identifier.

12. A mobile device as in claim 9 wherein the control circuitry, when providing the application request to the security application distribution website, is constructed and arranged to:
  send a location identifier to the security application distribution website, the location identifier identifying a current location of the mobile device, the mobile security application being provided to the mobile device from the security application distribution website as part of the website response only if the security application distribution website determines that the current location is an authorized installation location.

13. A computer program product having a non-transitory computer readable medium which stores a set of instructions to provision a mobile device with a security application on the fly, the set of instructions, when carried out by computerized circuitry of the mobile device, causing the computerized circuitry to perform a method of:
  providing an initial access request to an enterprise gateway which is operated by an enterprise;
  receiving an enterprise response message from the enterprise gateway in response to the initial access request, the enterprise response message denying access to a set of enterprise resources of the enterprise; and
  automatically prompting the mobile device to install a mobile security application from an application server in response to the enterprise response message denying access to the set of enterprise resources of the enterprise;
wherein the enterprise response message includes an address identifying the application server;
wherein prompting the mobile device to install the mobile security application from the application server includes:
  prompting a user of the mobile device for an accept command to (i) download the mobile security application from the application server and (ii) automatically install the mobile security application on the mobile device;
wherein the initial access request is sent to the enterprise gateway via a browser running on the mobile device;
wherein the address identifying the application server is a universal resource locator (URL) which identifies a security application distribution website as the application server;
wherein the method further comprises:
  receiving the accept command from the user of the mobile device,
  in response to the accept command, providing an application request to the security application distribution website based on the URL,
  receiving a website response to the application request from the security application distribution website, the website response including downloading and installation of the mobile security application on the mobile device,
  after the mobile security application is downloaded and installed on the mobile device, invoking the mobile security application to establish an activation session between the mobile device and a security server,
  while the activation session between the mobile device and the security server is established, sending a set of authentication factors to the security server to enable the security server to create a user profile based on the set of authentication factors and bind the user profile to the enterprise, after the user profile is bound to the enterprise, providing an authentication request to the security server using the mobile security application, the authentication request including a new set of authentication factors, and receiving an authentication response from the security server in response to the authentication request;

wherein the authentication response includes an access token from the security server; and wherein the method further comprises:

providing another access request to the enterprise gateway which is operated by the enterprise, the other access request including the access token from the security server; and receiving another enterprise response message from the enterprise gateway in response to the other access request, the other enterprise response message granting access to the set of enterprise resources of the enterprise.

14. A computer program product as in claim 13 wherein the enterprise response message further includes a signed enterprise identifier which identifies the enterprise; and wherein providing the application request to the security application distribution website includes:

sending the signed enterprise identifier to the security application distribution website, the mobile security application being provided to the mobile device from the security application distribution website as part of the website response only if the security application distribution website successfully verifies the signed enterprise identifier.

15. A computer program product as in claim 13 wherein the enterprise response message further includes an enterprise identifier which identifies the enterprise; and wherein providing the application request to the security application distribution website includes:

sending the enterprise identifier to the security application distribution website, the mobile security application being selected, by the security application distribution website, from a set of different security applications based on the enterprise identifier.

16. A computer program product as in claim 13 wherein providing the application request to the security application distribution website includes:

sending a location identifier to the security application distribution website, the location identifier identifying a current location of the mobile device, the mobile security application being provided to the mobile device from the security application distribution website as part of the website response only if the security application distribution website determines that the current location is an authorized installation location.

* * * * *